United States Patent [19]
Hyman et al.

[11] Patent Number: 5,467,814
[45] Date of Patent: Nov. 21, 1995

[54] GRAPHITE/EPOXY HEAT SINK/MOUNTING FOR COMMON PRESSURE VESSEL

[75] Inventors: Nelson L. Hyman, Randallstown; William R. Braun, Seabrook; James C. Garner, Bowie, all of Md.; Lawrence R. Larson, Kitty Hawk, N.C.; Sheleen M. Tuner, North Beach, Md.

[73] Assignee: The United States of America as represented by the Secretary of the Navy, Washington, D.C.

[21] Appl. No.: 393,799

[22] Filed: Feb. 24, 1995

[51] Int. Cl.$^6$ .................................................. F28F 7/00
[52] U.S. Cl. ...................... 165/41; 165/80.1; 165/80.2; 165/185; 165/904; 429/120
[58] Field of Search ........................... 429/120; 165/41, 165/80.1, 80.2, 80.3, 185, 904

[56] References Cited

U.S. PATENT DOCUMENTS

| | | | |
|---|---|---|---|
| 1,789,475 | 1/1931 | Powell | 165/80.1 |
| 2,771,278 | 11/1956 | Slack | 165/80.3 |
| 2,833,966 | 5/1958 | Goodier et al. | 165/80.3 X |
| 2,888,228 | 5/1959 | Jarvis | 165/904 X |
| 4,871,012 | 10/1989 | Kuo | 165/41 |
| 5,257,463 | 11/1993 | Wheeler et al. | 34/20 |

OTHER PUBLICATIONS

Gadner et al., "Charge Control for the DSPSE NiHz CVP Battery", 93 NASA Aerosp. Battery Workshop, NASA PUE 3254, pp. 607–626, Nov. 1993.
Gadner et al., "The Clementine Nickel Hydrogen Common Pressure Vessel", 29th Intersociety Energy Conv. Engr. Conf., pp. 1–6, Aug. 1994.

Primary Examiner—Allen J. Flanigan
Attorney, Agent, or Firm—Thomas E. McDonnell; Charles J. Stockstill

[57] ABSTRACT

The graphite-epoxy heat sink and mounting structure is comprised of a mounting structure constructed of a graphite-epoxy material that is mounted around a heat generating pressure vessel located inside a spacecraft. The mounting structure is a graphite-epoxy structure having three segments. The first and third segments are a graphite-epoxy material with a high thermal conductivity but not necessarily capable of withstanding structural stresses. Between these thermal conductive segments is a segment of graphite-epoxy material capable of withstanding structural stresses to provide a structural integrity for the mounting structure. The thermal energy flows from the pressure vessel, through the thermal conductive layer to a shear panel of the spacecraft that radiates the thermal energy.

14 Claims, 2 Drawing Sheets

5,467,814

GRAPHITE/EPOXY HEAT SINK/MOUNTING FOR COMMON PRESSURE VESSEL

BACKGROUND OF THE INVENTION

1. Field of the Invention

This invention pertains to a heat transfer device and in particular to a device for transferring dissipated heat from a pressure vessel in a spacecraft.

2. Description of the Related Art

The economical transfer of dissipated heat from pressure vessels within spacecraft is an existing problem. One such heat source within a spacecraft are the electrochemical batteries which supply spacecraft power during eclipse periods when the solar arrays are not illuminated. As the electrochemical batteries are discharged and overcharged, the battery dissipates energy in the form of heat. Particularly, thermal control to maintain the temperature of such heat generating devices as the electrochemical battery within a desirable operating temperature (typically 0 to 20 degrees Celsius (°C.)) is accomplished for small spacecraft electrical loads through heat transfer via a battery mounting structure. However, for large thermal loads, additional thermal control devices are required to remove the excess heat generated.

Generally, in the space environment, thermal control of a spacecraft battery is achieved by conduction from the battery pressure vessel to a radiator, then by direct or indirect radiation to space. All of these methods require a means for securing a cylindrical pressure vessel to a flat mounting surface. The most common method is to secure the pressure vessel to a radiator panel by the use of an aluminum collar to conduct the heat from the pressure vessel wall through the aluminum collar to a radiator panel. Under large dissipative heat loads, the aluminum collar must be very large in order to conduct the high heat load and to maintain a uniform temperature across the pressure vessel. Heat pipes and louvers may be added to the thermal design to reduce the mass of the aluminum collar, but overall weight, complexity, and cost of the design is increased.

A previous design consisted of a mounting system external to the spacecraft whereby aluminum brackets linked a magnesium battery heat sink to a close-out panel on the spacecraft. The battery is restrained by the heat sink in the lateral axes while stainless steel straps restrain the axial displacement. This type of design was not faced with a weight limitation and as a result of the heat conduction requirements was quite heavy. In this design the magnesium heat sink was required to be isolated from the aluminum brackets, therefore, heat can not be transferred from the heat sink through the brackets into the spacecraft. The heat dissipated from the battery was radiated into space by radiator panels. Use of this system is impractical when interior mounting of the battery is required because the heat would be rejected to the inside of the spacecraft thereby requiring a heavier and more expensive thermal control system.

SUMMARY OF THE INVENTION

The object of this invention is to provide a light weight, low cost, heat conduction device capable of maintaining a heat generating pressure vessel, such as a battery, within its desired operating temperature range.

An object of this invention is to provide a heat conducting structure that would allow heat generating sources to be mounted within the spacecraft.

Another object of this invention is to provide a heat conducting structure that is easy to manufacture, adaptable and structurally highly temperate to physical damage.

These objects are achieved by utilization of an epoxy bonded graphite heat sink and mounting structure for mounting heat dissipating pressure vessels in satellites. The device utilizes the characteristics of graphite-epoxy materials (i.e., light weight, high thermal conductivity, highly directional mechanical properties) in fabricating a light weight mounting structure for a spacecraft application which is capable of retaining a pressure vessel during launch and on orbit operations while providing thermal control to ensure that the pressure vessel remains in the required temperature operating range. The pressure vessel may be installed internal to the spacecraft with this invention and shear panels on the exterior of the spacecraft serve to radiate the thermal energy generated by the pressure vessel.

DESCRIPTION OF THE PREFERRED EMBODIMENT

In the following description of the preferred embodiment of the graphite-epoxy heat sink and mounting device like components have like reference numbers.

Graphite-epoxy composites provide both a light structural weight and have a high specific thermal conductance; i.e., heat removal capability. However, high thermal conductivity graphite fibers tend to have poor structural properties while fibers having good structural characteristics tend to have poor thermal conductivity. Therefore, in this device, a hybrid structure is made of both graphite fibers having good structural capability (those of high strength, i.e., >500 ksi) and graphite fibers having high thermal conductivity (>500 watts/meter/°K.). This combination results in a structure having a high structural capability along with good thermal conductivity.

Figure 1:
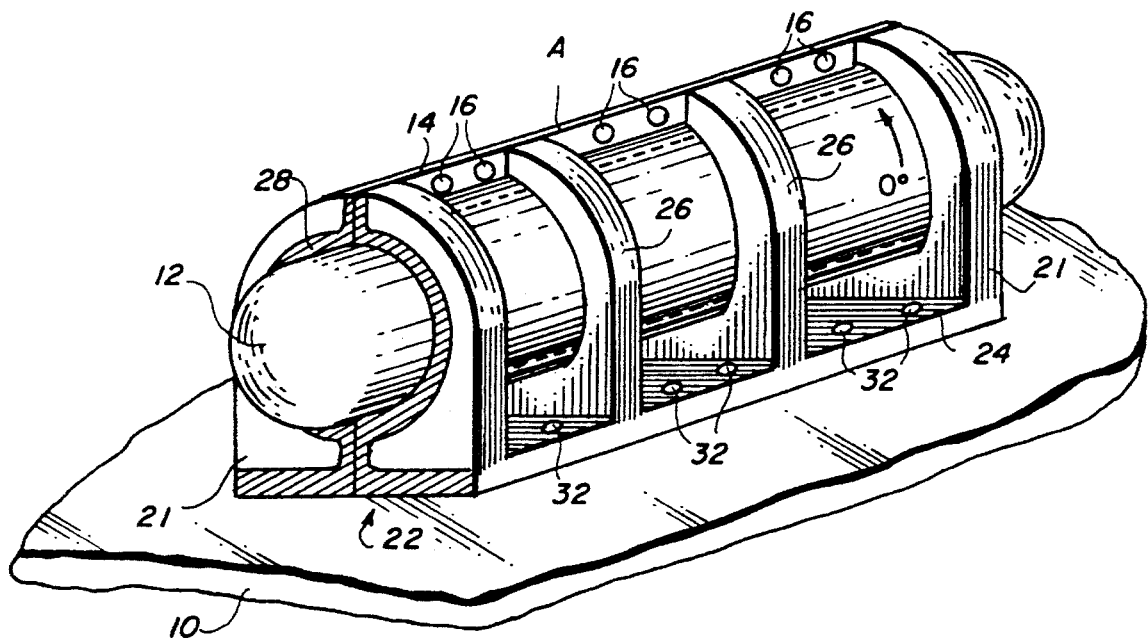
FIG. 1 is an oblique view of a pressure vessel installed within the graphite-epoxy heat transmitter and mounting structure.

As shown in FIG. 1, the graphite-epoxy heat sink and mounting device 10 is comprised of a hybrid heat conducting layer of material 28 surrounding a pressure vessel 12 that also forms a mounting plate 24 which is attached to a shear panel 18 that is part of the exterior surface of a spacecraft (not shown).

Figure 2:
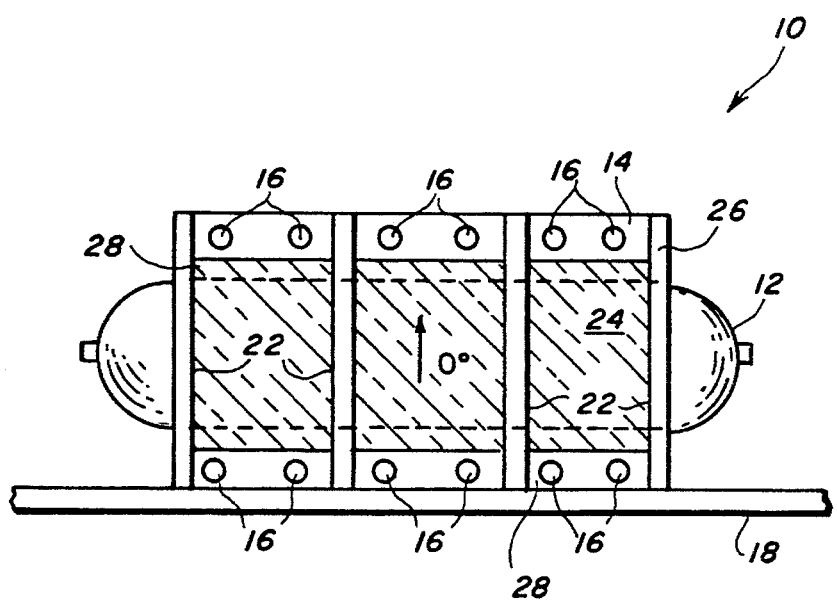
FIG. 2 is a side view of the graphite-epoxy heat transmitter and mounting structure with the pressure vessel installed.

As shown in FIG. 2, the mounting structure 22 does not cover the entire exterior surface of the pressure vessel 12, however, the extent of coverage is to be determined by the design requirements imposed upon the design engineer.

Figure 3:
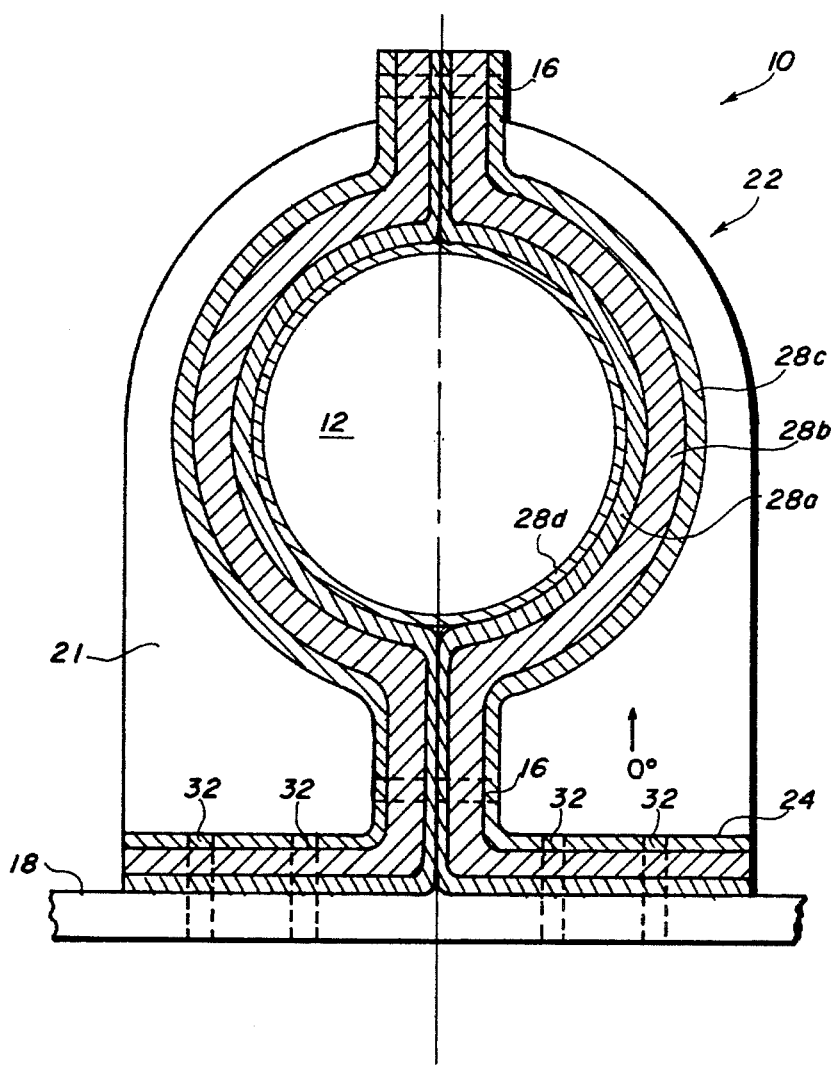
FIG. 3 is an end view of the graphite-epoxy heat sink and mounting structure with the pressure vessel installed.

The hybrid heat conducting layer 28 is comprised if three segments. Referring to FIG. 3, the first and third segments 28a and 28c, respectively, are made of unidirectional graphite fibers, such as P120, manufactured by Amoco Performance Products, Inc. of Alpharetta, Ga., layed around the pressure vessel 12 with the fibers in a vertical direction (0° orientation). These segments 28a and 28c provide the heat path from the pressure vessel 12 to the shear panel 18. It is necessary to have a continuous fiber path from the top of the pressure vessel 12 to the base of the shear panel 18 in order to provide maximum heat conduction. Graphite fibers such as the P120 conduct heat well in the direction of the fiber. The graphite fibers 28a and 28c forming the first and third segments of the heat sink may be any number of layers, six being nominal, and may be of any desired thickness, however, 0.005 inch is a nominal thickness.

A second segment of graphite fiber 28b is laid between the graphite fibers 28a and 28c to provide structural integrity. The structural graphite fiber 28b is one having a high structural capability, such as T300, also manufactured by Amoco Performance Products, Inc. The structural graphite fibers 28b may be of any thickness and any number of layers may be utilized, nominally 16 layers of 0.005 inch thickness have been found to be adequate to provide the requisite structural rigidity for spacecraft use. The fibers of the various layers of structural graphite fiber 28b are oriented in different directions to meet structural strength and stiffness requirements imposed upon the designer. The fiber orientation for the nominal sixteen layer application is recommended to be as follows: [90, 45, −45, 90, 90, −45, 45, 90]s.

At the bottom of the hybrid structure, the three segments 28a, 28b, and 28c are positioned to form a mounting plate 24. At the top of the hybrid structure, the three segments 28a, 28b, and 28c are positioned to form a lateral spine 14 for bolting the two halves together.

The heat sink and mounting structure 10, is formed in two halves. Prior to laying out the bifurcated sections of the hybrid heat conducting layer, endplates 21, and ribs 26 which provide rigidity and additional structural integrity are formed upon which the hybrid heat conducting layers are formed. The lateral spine 14 and the area between the bottom of the pressure vessel 12 and the mounting plate 24 are drilled to provide holes 16 for joining the two halves together around the pressure vessel 12.

All of the layers of graphite fibers are joined by an epoxy resin, such as EA934NA manufactured by HYSOL Industrial Products of Seabrook, N.H. However, any epoxy resin known to those practicing in the art may be used.

Bolt holes 32 in the mounting plate 24 of the heat sink and mounting device 10 allow attachment of the unit with pressure vessel 12 to a shear panel 18 on the satellite. The bolts (not shown) between the mounting panel 24 and the shear panel 18 provide enough contact pressure for good heat transfer and mechanical load transfer to the shear panel 18. If desired by the user a thermally conductive interface filler material may be applied between the mounting panel 24 and the shear panel 18 to increase heat conduction between the panels. The spacecraft shear panel 18 may serves as a radiator heat sink and is maintained less than the maximum allowed battery temperature under the worst-case thermal loads.

Epoxy material, such as a mixture of Eccosil 4954 manufactured by Emerson & Cumming of Canton, Mass. and Catalyst 50, also manufactured by Emerson & Cumming is used to bond the pressure vessel 12 into the heat sink assembly 10. The epoxy fills any gaps between the pressure vessel 12 and the halves of the heat sink and mounting device 10 in order to assure good heat transfer characteristics. The combination of bonding epoxy and the bolting of the heat sink assembly 10 halves provides enough friction to hold the pressure vessel 12 stationary during lateral vibration.

If the pressure vessel 12 is an electrical device, such as a battery, the pressure vessel 12 is wrapped in an insulation material 28d to provide electrical isolation between the vessel 12 and the heat sink 10. The insulation material 28d may be any nonconducting material, preferably a material such as Kapton® manufactured by DuPont Corp. of Circleville, Ohio.

Thin film heaters (not shown) and thermostats (not shown) may be attached to the outer surface of the heat sink assembly 10 to provide additional heat to the pressure vessel to maintain an operating temperature above the minimum allowed worst case cold periods. Other devices (not shown), such as brackets, to hold various subsidiary components or connectors associated with the pressure vessel may be attached to the heat sink assembly 10, however, these devices should also be made of a graphite-epoxy material in order to maintain a weight saving.

Figure 4:
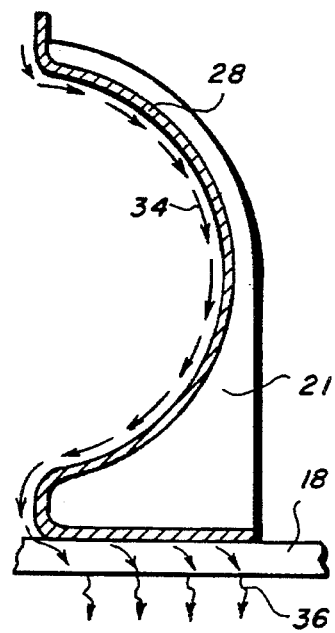
FIG. 4 is a schematic of the heat flow in the mounting structure from the pressure vessel to the radiator.

The graphite-epoxy heat sink assembly 10 also allows a tailorable heat path. The graphite fibers forming layers 28a and 28c may be oriented in various directions to meet the heat sink path requirements of various designs. In the device, as described above, heat flows along the hybrid heat conducting layer 28, as shown in FIG. 4, along the inner face of the halves of the heat sink and mounting device 10 into the shear plate 18 through which it is radiated 36 to space, thereby providing an efficient flow path for the heat generated by the pressure vessel 12.

An advantage of the graphite-epoxy heat sink assembly 10 is that the design is damage tolerant. Referring again to FIG. 3, because the first segment of graphite fiber 28a is tightly held against the pressure vessel 12, and not exposed, it is not subject to damage caused by impact. Further, delamination (separation of plies, or layers) does not materially detract from either the structural integrity of the heat sink assembly 10 or its thermal properties.

This device eliminates the use of restraining straps found in the prior art, thereby reducing the quantity and weight of parts in the design. Also, variations in the dimensions of the pressure vessel 12 can easily be accommodated by the addition or subtraction of fiber layers. The design allows for the accommodation of almost any size of pressure vessel. As larger or smaller pressure vessels vary the size requirements, a new mold will allow for any number to be manufactured at a cost lower than the cost of modifying the heat sink devices shown in the prior art.

Obviously, many modifications and variations of the present invention are possible in light of the above teaching. It is therefore to be understood that, within the scope of the appended claims, the invention may be practiced otherwise than as specifically described.

What is claimed is:

1. A heat transmitter and mounting structure a pressure vessel generating a thermal dissipation;

a shear panel acting as a radiator for the thermal dissipation of the pressure vessel that is a part of a larger external surface of a spacecraft; and a heat transmitter assembly comprised of a mounting structure constructed of layers of graphite fibers divided into halves having a means of joining the halves together so as to restrain the pressure vessel and a mounting plate made of layers of graphite fibers having a means for mounting the heat transmitter assembly onto the shear panel, and layers of graphite fiber between the pressure vessel and the mounting structure, the mounting structure, mounting plate and layers of graphite fibers cooperating to conduct thermal energy from the pressure vessel to the shear panel.

2. A heat transmitter and mounting structure, as in claim 1, further comprising a means for controlling temperature of the pressure vessel within a predetermined limit.

3. A heat transmitter and mounting structure, as in claim 1, wherein the pressure vessel is a battery.

4. A heat transmitter and mounting structure, as in claim 1, wherein the layers of graphite fibers between the pressure vessel and the mounting structure, and those forming the mounting structure are bonded with an epoxy resin.

5. A heat transmitter and mounting structure, as in claim 1, further comprising a means of electrically isolating the pressure vessel from the heat transmitter assembly.

6. A heat transmitter and mounting structure, as in claim 5, wherein the means of electrically isolating the pressure vessel from the heat transmitter assembly is a layer of non electrically conducting material bonded to the pressure vessel.

7. A heat transmitter and mounting structure, as in claim 1, wherein the layers of graphite fibers are comprised of a first layer of graphite fibers adapted to conducting thermal energy but not necessarily capable of withstanding structural stresses, a second layer of graphite fibers capable of withstanding structural stresses, and a third layer of graphite fibers capable of conducting thermal stresses but not necessarily capable of withstanding structural stresses.

8. A heat transmitter and mounting structure, as in claim 7, wherein an angle of the graphite fibers in one layer is different from any adjacent angle of the graphite fiber in the second layer of graphite fibers to control the quantum of heat conducted by the means for conducting thermal energy.

9. A heat transmitter and mounting structure comprising:
  a pressure vessel generating thermal energy;
  a layer of electrical insulating material wrapped around the pressure vessel;
  a heat conducting structure made of layers of graphite fibers attached to the insulated pressure vessel;
  a mounting plate capable of conducting heat attached to the heat conducting structure; and
  a radiator, to which the mounting plate is attached, for radiating thermal energy that is conducted from the pressure vessel, through the heat conducting structure and mounting plate to the radiator.

10. A device for controlling the temperature of a common pressure vessel within a spacecraft comprising:
  a pressure vessel that generates the thermal energy;
  a layer of electrical insulating material wrapped around the pressure vessel;
  a radiator to radiate the thermal energy;
  means for heating the pressure vessel during periods of cold environment; and
  a heat transmitter assembly further comprised of a mounting structure and a thermal conductive layer wrapped around the insulated pressure vessel.

11. A device, as in claim 10, wherein the mounting structure and thermal conductive layer are made of layers of a graphite fiber bonded together with an epoxy resin.

12. A device, as in claim 11, wherein the layers of graphite fibers in the thermal conductive layer are oriented at different angles.

13. A device, as in claim 11, wherein the means for heating the pressure vessel are electrical heaters controlled by thermostats.

14. A device, as in claim 12, wherein the layers of graphite fibers are composed of a plurality of highly thermal conductive graphite fibers and plurality of layers of high strength graphite fibers capable of withstanding structural stresses.

* * * * *